(12) United States Patent
Arkwright (10) Patent No.: US 11,219,956 B1
(45) Date of Patent: Jan. 11, 2022

(54) PEELER DEVICE

(71) Applicant: Reed Manufacturing Corporation, Erie, PA (US)

(72) Inventor: Chris Arkwright, Erie, PA (US)

(73) Assignee: Reed Manufacturing Company, Erie, PA (US)

( * ) Notice: Subject to any disclaimer, the term of this patent is extended or adjusted under 35 U.S.C. 154(b) by 0 days.

(21) Appl. No.: 16/184,992

(22) Filed: Nov. 8, 2018

Related U.S. Application Data (60) Provisional application No. 62/583,205, filed on Nov. 8, 2017.

(51) Int. Cl.
*B23D 21/06* (2006.01)
*B23B 5/16* (2006.01)

(52) U.S. Cl.
CPC .............. *B23D 21/06* (2013.01); *B23B 5/168* (2013.01); *B23B 5/166* (2013.01); *B23B 2215/72* (2013.01); *B23B 2220/40* (2013.01); *B23B 2226/61* (2013.01)

(58) Field of Classification Search
CPC ......... B23D 21/06; B23B 5/168; B23B 5/167; B23B 5/166; B23B 2215/72; B23B 2220/40; B23B 2226/61
See application file for complete search history.

(56) References Cited

U.S. PATENT DOCUMENTS

| 4,016,614 A * | 4/1977 | Press ....................... B23B 5/167 7/165 |
| 4,691,600 A * | 9/1987 | Carlson ................... B23B 5/168 144/205 |
| 6,487,947 B1 * | 12/2002 | Clai ........................ B23B 5/168 408/206 |
| 2002/0129684 A1 * | 9/2002 | Oswald .................. B23B 5/168 82/113 |
| 2004/0226423 A1 * | 11/2004 | Oswald .................. B23B 5/168 83/165 |
| 2013/0055507 A1 * | 3/2013 | Li .......................... B23B 5/167 7/157 |

FOREIGN PATENT DOCUMENTS

DE          19903293 C1 * 10/2000   ............. B23B 5/168

OTHER PUBLICATIONS

English machine translation of DE 19903293 C1, Oct. 2000 (Year: 2000).*

* cited by examiner

*Primary Examiner* — Alan Snyder (74) *Attorney, Agent, or Firm* — Bauer Law Offices; Robert M. Bauer (57) ABSTRACT

A peeler device removes a thin layer from the outer surface of the end of a plastic pipe or tapping tee. In the preferred embodiments, the device has a main body and a mandrel. The pipe to be peeled is pushed onto the mandrel when the mandrel is in an out position. As the main body is rotated, a blade advances onto the plastic pipe and peels a thin layer off the outer surface of the pipe as it is advanced. The main body is rotated until peeling is complete. There may be a sight window in the main body to permit visual confirmation of when peeling is complete. A spring loaded blade lever is actuated to raise the blade and the pipe is pulled out of the main body.

20 Claims, 7 Drawing Sheets

Section C-C

PEELER DEVICE

This application claims priority to U.S. Provisional Patent Application No. 62/583,205 filed on Nov. 8, 2017, the contents of which are hereby incorporated by reference in their entirety.

FIELD OF THE INVENTION

The invention relates to hand tools for plastic parts. More particularly, the invention relates to devices for removing a thin layer from the outer surface of a plastic part such as a pipe or tapping tee.

BACKGROUND

It is sometimes necessary to remove a thin layer from the end of a MDPE, HDPE, polyethylene, or other plastic pipe or from a tapping tee outlet to ensure that it is clean and free of oxidation. Such a step may, for example, be a necessary prerequisite to an electrofusion method that securely joins together two plastic parts providing natural gas.

Electrofusion uses special fittings that have built-in electric heating elements which are used to weld the joint together. The plastic parts, such as pipes, are inserted into the electrofusion fitting (with a temporary clamp if required) and a voltage (typically 40V) is applied for a fixed time depending on the fitting in use. The built in heater coils then melt the inside of the fitting and the outside of the plastic part, which weld together producing a very strong homogeneous joint. The assembly is then left to cool for a specified time.

To ensure that there are no leaks, the pipes to be joined must be cleaned and a thin layer of the plastic must be removed in the area that is inserted into the coupling.

BRIEF SUMMARY

The preferred embodiments of the invention are a peeler device which removes a thin layer from the outer surface of the end of a plastic pipe or tapping tee. Previous devices have been able to remove a thin layer, but were disadvantageous for a number of reasons. For example, conventional devices with a large swing radius cannot be used on tapping tee outlets with limited clearance.

The preferred embodiments of the invention contain a main body and a mandrel. The pipe to be peeled is pushed onto the mandrel when the mandrel is in the out position. As the main body is rotated, a blade advances onto the plastic pipe. The blade peels a thin layer off the outer surface of the pipe as it is advanced. The main body is rotated until peeling is complete. A sight window may be provided in the main body to permit visual confirmation of when peeling is complete. A spring loaded blade lever is actuated down to raise the blade and the pipe is pulled out of the main body.

DETAILED DESCRIPTION OF THE PREFERRED EMBODIMENTS

Figure 1:
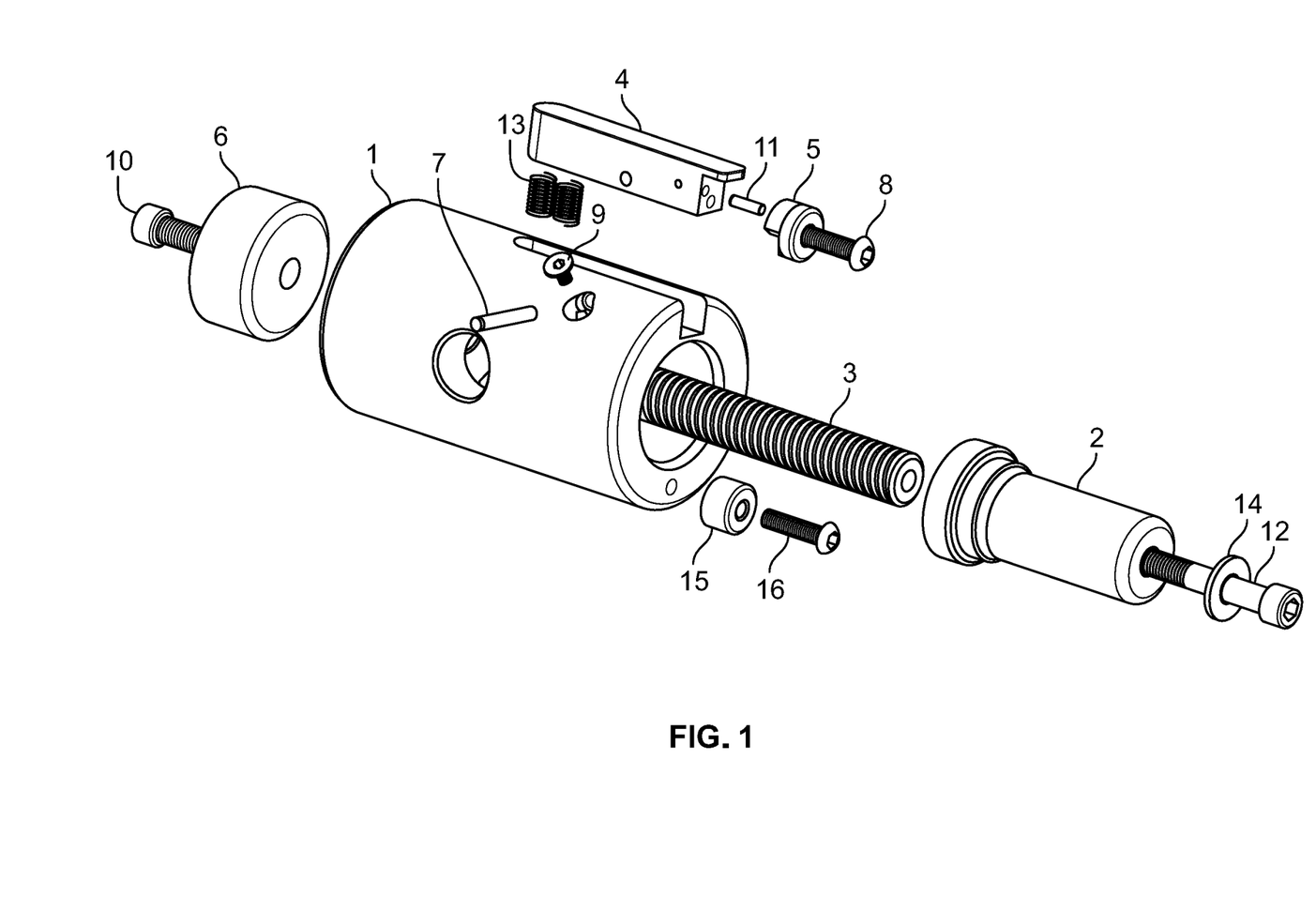
FIG. 1 is an exploded perspective view of a peeler device according to a preferred embodiment of the invention.
Figure 2:
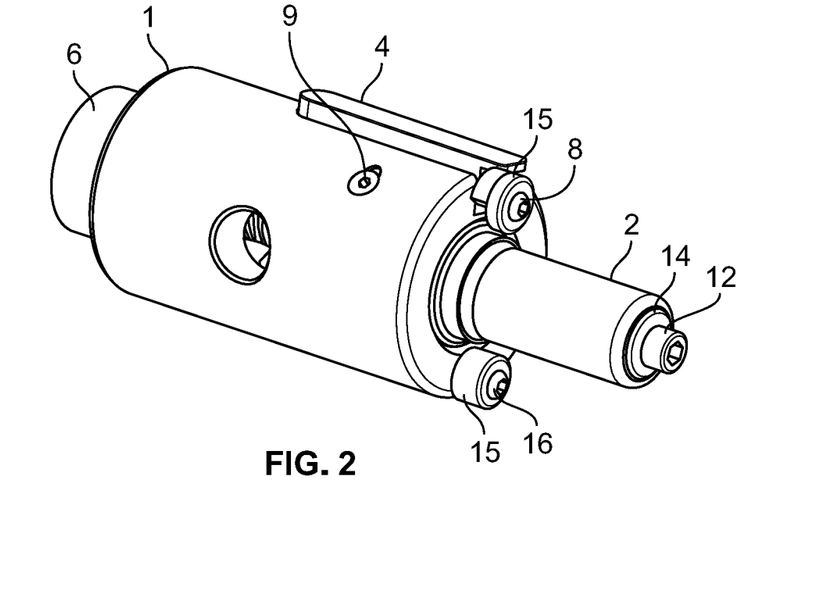
FIG. 2 is a perspective view of the peeler device in FIG. 1 when it is completely assembled.
Figure 3A:
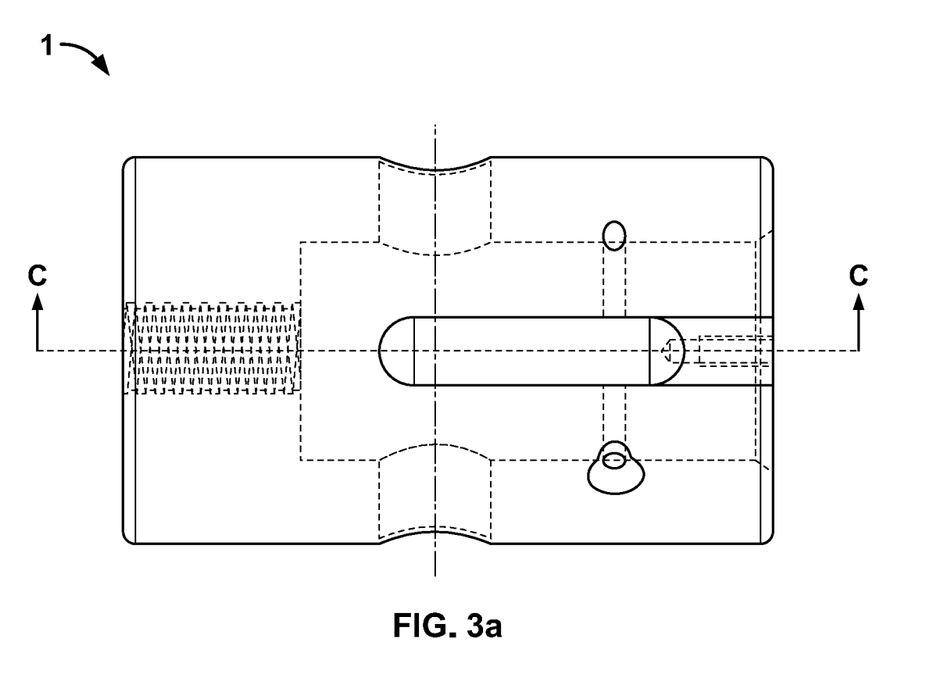
FIG. 3(a) is a top view of the main body 1 of the peeler device in FIG. 1.
Figure 3B:
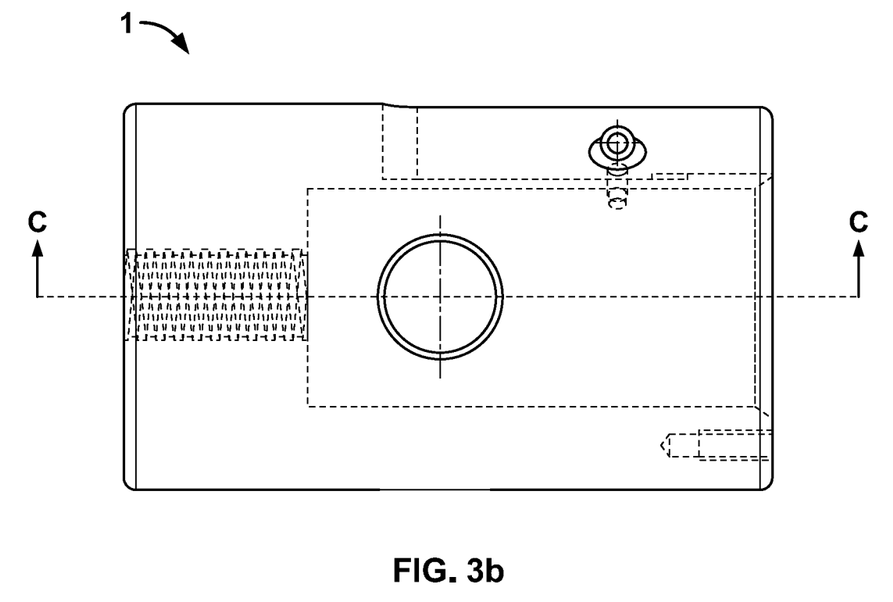
FIG. 3(b) is a side view of the main body 1 of the peeler device in FIG. 1.
Figure 3C:
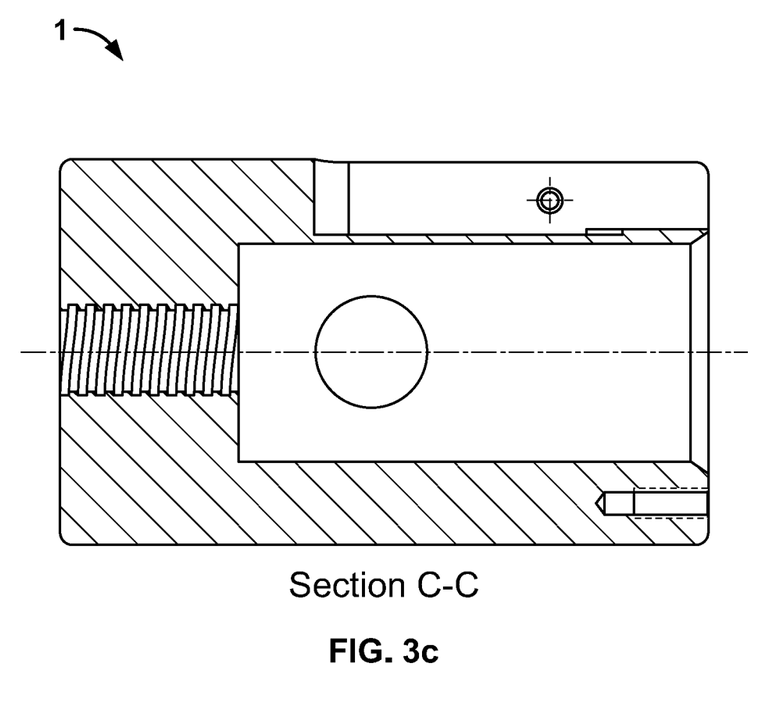
FIG. 3(c) is a cross-sectional side view of the main body 1, along sectional line C-C in FIG. 3(a).
Figure 3D:
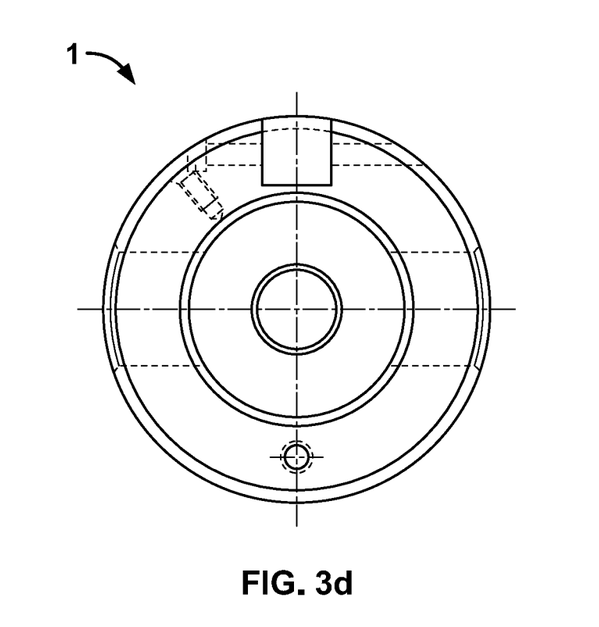
FIG. 3(d) is an end view of the main body 1 of the peeler device in FIG. 1.

A peeler device according to a preferred embodiment shown in FIGS. 1 and 2 has a main body 1 which is generally cylindrical in shape. Although the device is generally described herein with respect to a plastic pipe, it is to be understood that the device may also be used with a tapping tee.

The main body 1 of the peeler device is preferably composed of aluminum, but may also be composed of a hard plastic or other durable material. A first end of main body 1 is closed except for a threaded hole at its center. A feed screw 3 matches the threaded hole and, when rotated in relation to the main body, feed screw 3 moves in the direction of the longitudinal axis of the cylindrical main body 1. Preferably, the first closed end of main body 1 is sufficiently thick, such as 1 inch, so as to support feed screw 3. A feed screw knob 6 is fixedly attached to the end of feed screw 3 by a screw 10 or by any other suitable means. The distance that feed screw 3 may move in the direction away from the first end of main body 1 is limited by knob 6 coming into contact with the first closed of main body 1. The outer circular surface of knob 6 and a portion of the outer circular surface of main body 1 adjacent the first end may be subjected to a diamond knurl process to facilitate gripping by a user's hands without slipping when rotating the feed screw 3 relative to main body 1.

The second end of main body 1 is substantially open. The inner diameter of the second end is large enough that it not only permits drive screw 3 to extend therethrough; but it also accommodates mandrel 2 and the plastic pipe to be peeled. The inner diameter of main body 1 constrains the outer diameter of the mandrel. A blade mount notch 4-1 in the circular periphery portion of main body 1 extends from a point in the midsection of main body 1 to the second end, and has depth that is less than the periphery portion of the main body 1. Details of a preferred embodiment of main body 1 is shown in FIGS. 3(a)-3(d).

Figure 6A:
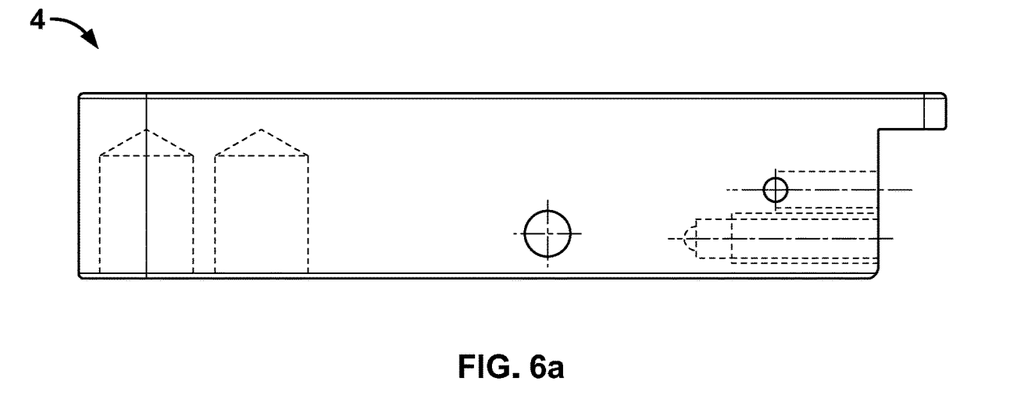
FIG. 6(a) is a side view of the blade mount 4 of the peeler device shown in FIG. 1.
Figure 6B:
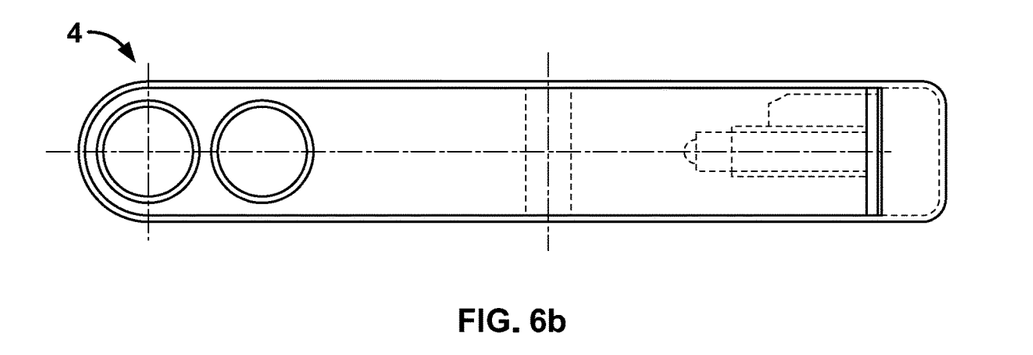
FIG. 6(b) is a top view of the blade mount 4 of the peeler device shown in FIG. 1.
Figure 6C:
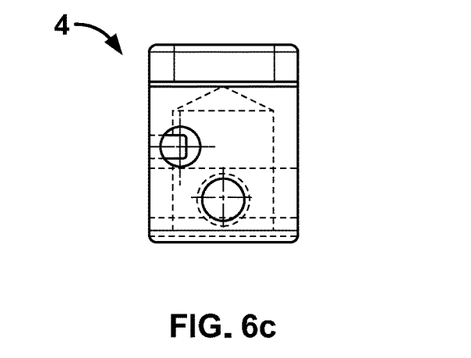
FIG. 6(c) is an end view of the blade mount 4 of the peeler device shown in FIG. 1.

A preferred blade mount 4 is shown in FIGS. 6(*a*)-6(*c*). The cross-section of blade mount 4 fits within the cross-section of blade mount notch 4-1, and pivots about a pin 7 that extends through the periphery of the main body 1 and through blade mount notch 4-1. Pin 7 may be secured in place by a screw 9 or by other suitable means. A pair of springs 13 is located in respective chambers of the portion of blade mount notch 4-1 on the opposite side of pin 7 from the second end. Springs 13 thus bias blade mount 4 so that, when no pipe is inserted into the plastic pipe peeler, blade mount 4 is pushed down against the edge of blade mount notch 4-1 at the second end of main body 1. The blade mount 4 is preferably, but need not be, composed of the same material as main body 1.

Figure 4A:
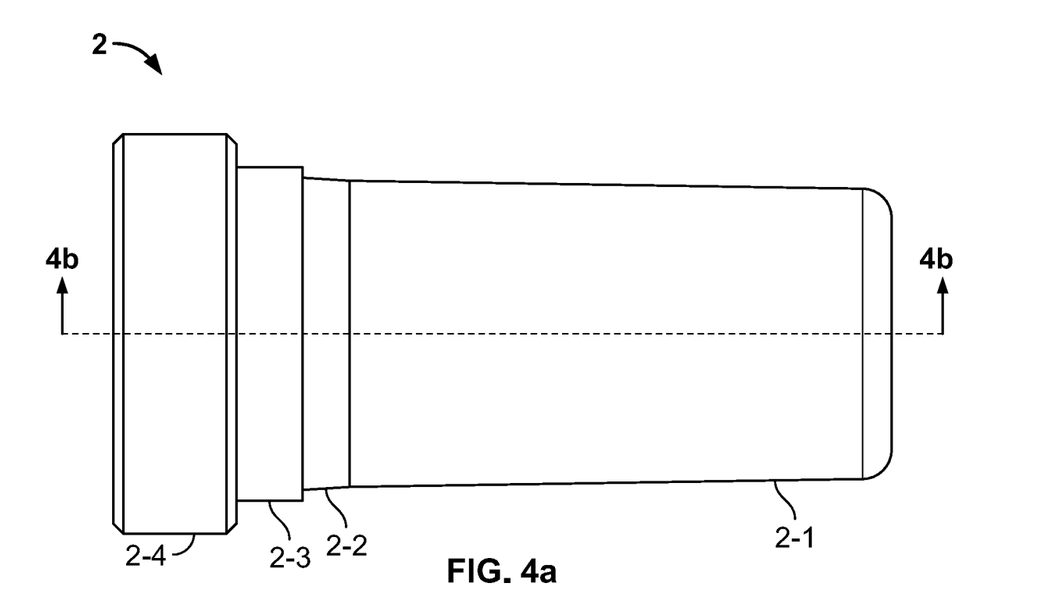
FIG. 4(a) is a side view of the mandrel 2 in the peeler device in FIG. 1.
Figure 4B:
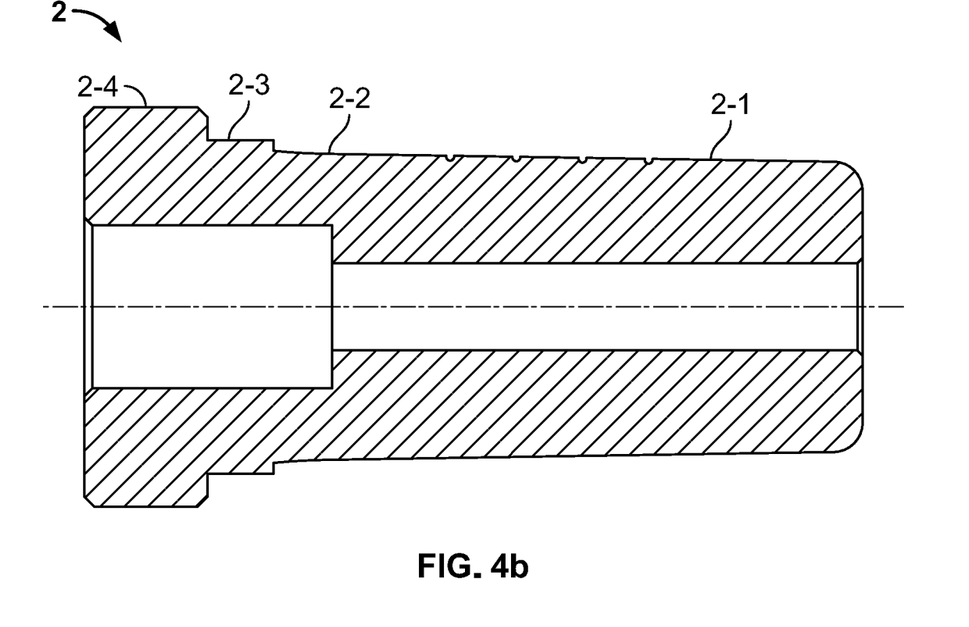
FIG. 4(b) is a cross-sectional side view of the mandrel 2 in the peeler device in FIG. 1, along sectional line A-A in FIG. 4(a).
Figure 4C:
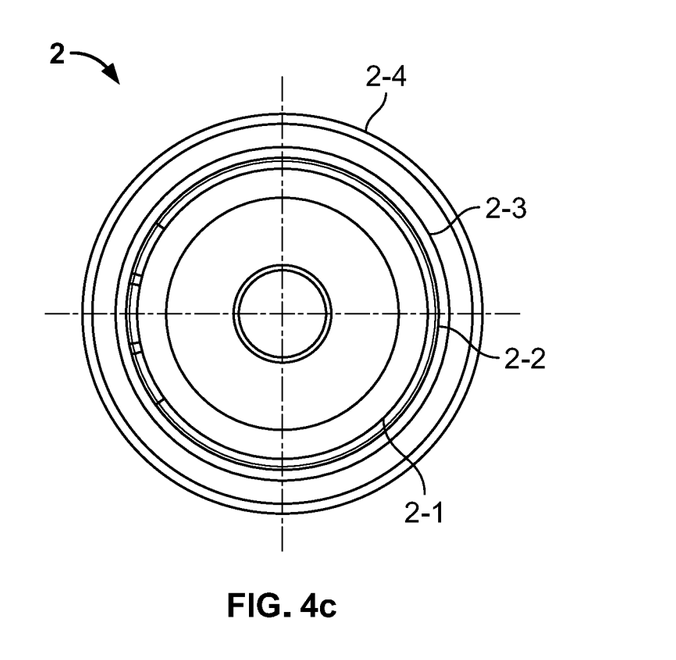
FIG. 4(c) is an end view of the mandrel 2 in the peeler device in FIG. 1.
Figure 5A:
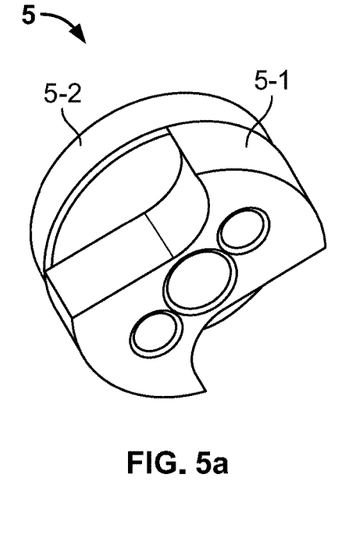
FIG. 5(a) is a perspective view of the blade assembly of the peeler device in FIG. 1.
Figure 5B:
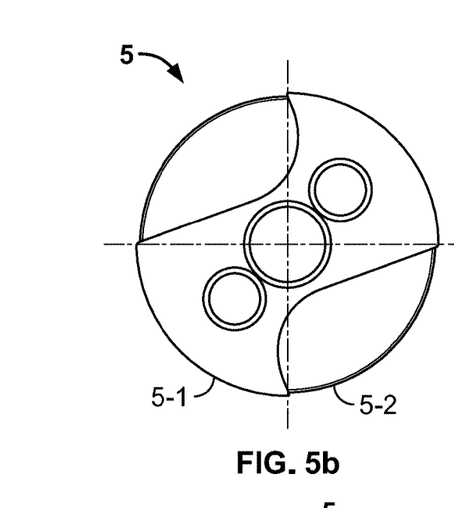
FIG. 5(b) is an end view of the blade assembly 5 of the peeler device in FIG. 1.
Figure 5C:
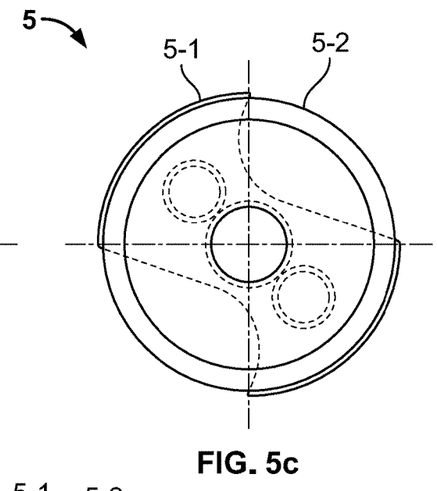
FIG. 5(c) is a view of the blade assembly 5 from the opposite end of the view shown in FIG. 5(b).
Figure 5D:
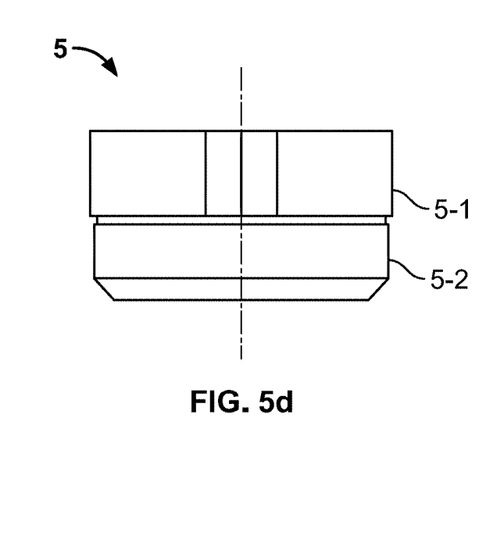
FIG. 5(d) is a top view of the blade assembly 5 of the peeler device in FIG. 1.
Figure 5E:
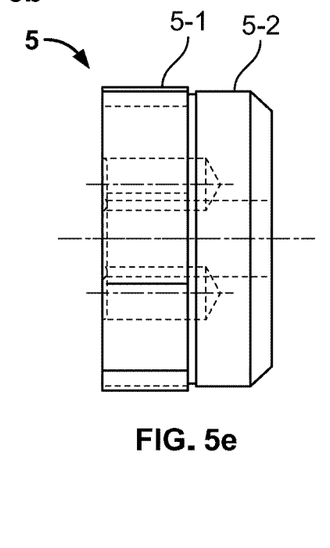
FIG. 5(e) is a cross-sectional view of the blade assembly 5, along the line shown in FIG. 5(d).

Mandrel 2 is preferably composed of acetal copolymer, aluminum or the equivalent and fixedly attached to drive screw 3 by a screw 12 and washer 14, but may be attached by other means as well. Mandrel 2 is centered on drive screw 3 and is therefore centered with respect to main body 1. Preferably, friction fit of the pipe on mandrel 2 allows the main body 1 and blade 5 to rotate around the pipe as they advance down the pipe while mandrel 2, drive screw 3 and the pipe remain stationary and do not rotate. While mandrel 2 is generally cylindrical and has a circular cross-section throughout, it is made to have at least three different diameters so as to receive and center the plastic pipe to be peeled. The smallest diameter cross-section 2-1 extends from the end of mandrel 2 next to screw 12 over most of the length of mandrel 2. The plastic pipe to be peeled fits somewhat loosely over this section of mandrel 2, which may be slightly tapered as shown in FIGS. 4(*a*) and 4(*b*). A second diameter cross-section 2-2 is slightly larger than and tapered to cross-section 2-1, and the plastic pipe to be peeled fits snugly and is abutted against 2-3. Sections 2-1 and 2-4 ensure that the plastic pipe is perfectly centered within main body 1 and horizontally positioned for peeling. A third cross-section 2-4 has the largest diameter and is contained by the inside diameter of main body to maintain radial position of the pipe in reference to the main body. A round guide 15 is secured by screw 16 at a position on the main body 1 opposite the blade assembly 5. The plastic pipe peeler may have one or two sight holes 17 that permit one to see the position of mandrel 2 inside of main body 1.

The details of blade assembly 5 are shown in FIGS. 5(*a*)-5(*e*). It has a cutting portion 5-1 with two blades having sharp cutting edges, an end cap 5-2, pin 11 and a securing screw 8 (or other means attaching blade assembly 5 to blade mount 4). The cutting portion 5-1 is preferably shaped exactly as shown in FIGS. 5(*a*)-5(*e*) and composed of long-lasting cutting material, such as heat treated ⅝ A2 steel or the equivalent. When one edge becomes dull, screw 8 is loosened, the blade is pulled off pin 11, and rotated 180 degrees. The blade is set back on the pin, and the screw 8 is tightened to leave a new edge in the cutting position.

The diameter of cross-sections 2-2 and 2-3 are large enough so that, when no plastic pipe is present and these cross-sections are below cutting portion 5-1, cutting portion 5-1 (biased by springs 13) will come into direct contact with, and rest on, cross-sections 2-2 and 2-3 as shown in FIG. 2. When the plastic pipe to be peeled is present and cross-section 2-2 is below cutting portion 5-1, the drive screw 3 can be turned so that a thin layer, for example, approximately 0.009" to 0.012", is removed from the outer surface of the plastic piper by cutting portion 5-1. The diameter of cross-section 2-1 is small enough so that when it is below cutting portion 5-1, the downward movement of blade assembly 5 is restricted by blade mount notch 4 and the blade assembly 5 will never come into contact with cross-section 2-1.

A plastic pipe is peeled by performing the following steps. The plastic pipe is put on mandrel 2. The feed screw know 6 is rotated clockwise until the mandrel 2 is fully extended. While holding down blade level 4, the plastic pipe is pushed onto mandrel 2 until it reaches the tapered section of mandrel 2. Main body 1 or drive screw 3 is rotated to move mandrel 2 and the plastic pipe in the direction of the closed first end of main body 1. As mandrel 2 is being moved, a cutting edge of cutting portion 5-1 engages with the rotating outer surface of the pipe and advances down the pipe, removing a thin outer layer of the pipe. The blade assembly 5 works by allowing the cutting edge to penetrate the outer surface of the pipe until the surface 5-2 contacts the outer surface of the pipe to ensure that only a predetermined amount (for example, 0.009") of the outer surface of the pipe is removed. The main body 1 is rotated until the end of the plastic pipe can be viewed in the observation window in the main body 1. Blade level 4 is held down again to raise the blade while pulling the plastic pipe from the peeler device. The mandrel fits inside of main body 1 so that, along with blade assembly 5 and guide 15, it ensures that the pipe is centered and does not contact the inside of main body 1. The arrangement of the device also ensures that nothing comes into contact with the peeled portion of the pipe after the outer layer of the pipe is removed. The complete lack of contact is preferable for sensitive operations such as the electrofusion of pipes for natural gas.

The shape and dimension of blade assembly 5 are very important. For example, diameters 5-1 and 5-2 must be maintained and are crucial in ensuring that the proper amount of material has been removed. As a result of these features, the plastic pipe peeler of the preferred embodiment is very effective and accurate at removing a thin layer of the pipe while remaining relatively quick and simple to use.

Mandrel 2 and drive screw 3 have a length and attachment to each other such that when mandrel 2 is moved the maximum distance away from the main body 1 (when feed screw knob 6 is against the first end of main body 1), cross-section 2-3 will be under cutting portion 5-1 as shown in FIG. 2. Conversely, drive screw 3 and mandrel 2 can be moved so that mandrel 2 is entirely within main body 1 and there is no portion of mandrel 2 under blade assembly 5. Although the diameter of the main body of the peeler device is largely dictated by the diameter and wall thickness of the plastic pipe to be peeled, a single peeler device can be used with a limited range of plastic pipes by changing the mandrel while keeping the same main body.

What is claimed is:

1. A peeler device for peeling a thin layer from the end of a plastic pipe or tapping tee, the peeler device comprising:
   a main body having a hollow interior;
   a threaded drive screw in the hollow interior of the main body;
   a mandrel located in the hollow interior of the main body and attached to the threaded drive screw, the mandrel being tapered so as to receive and hold the plastic pipe or tapping tee in place at multiple fitting positions, and the plastic pipe or tapping tee is fitted around the mandrel at one of said multiple fitting positions according to the inner diameter of the plastic pipe or tapping tee such that the peeler device can peel plastic pipes and tapping tees of different inner diameters; and a blade located outside of the main body, the blade cutting off a thin layer of the outer surface of the plastic pipe or tapping tee as the main body is rotated relative to the plastic pipe or tapping.

2. The peeler device recited in claim 1, wherein the blade is a spring actuated blade biased against the outer surface of the plastic pipe or tapping tee.

3. The peeler device recited in claim 2, wherein the blade is a hardened tool steel cutting blade with two cutting edges.

4. The peeler device recited in claim 1, wherein the thin layer is approximately 0.009"-0.012" in thickness.

5. The peeler device recited in claim 1, wherein the main body has an observation window and the plastic pipe or tapping tee can be viewed through the observation window to determine when the peel is complete.

6. The peeler device recited in claim 1, wherein the main body has an open end and a closed end, and the blade is located outside and adjacent to the open end of the main body.

7. The peeler device recited in claim 6, wherein the cutting edge of the blade is outside the main body.

8. The peeler device recited in claim 7, wherein the cutting edge of the blade is entirely outside the main body.

9. A peeler device for peeling a thin layer from the end of a plastic pipe or tapping tee, the peeler device comprising:
   a main body having a hollow interior, an outer peripheral surface, an open end, and a closed end;
   a threaded drive screw in the hollow interior of the main body;
   a mandrel located in the hollow interior of the main body and attached to the threaded drive screw, the mandrel being tapered so as to receive and hold the plastic pipe or tapping tee in place; and
   a blade located outside and adjacent to the open end of the main body, the cutting edge of the blade located radially outside the outer peripheral surface and entirely outside the main body, and cutting off a thin layer of the outer surface of the plastic pipe or tapping tee as the main body is rotated relative to the plastic pipe or tapping.

10. The peeler device recited in claim 9, wherein the blade is a hardened tool steel cutting blade with two cutting edges.

11. The peeler device recited in claim 9, wherein the main body has an observation window and the plastic pipe or tapping tee can be viewed through the observation window to determine when the peel is complete.

12. A peeler device for peeling a thin layer from the end of a plastic pipe or tapping tee, the peeler device comprising:
   a main body having a hollow interior and an outer peripheral surface;
   a threaded drive screw in the hollow interior of the main body;
   a mandrel located in the hollow interior of the main body and attached to the threaded drive screw, the mandrel being tapered so as to receive and hold the plastic pipe or tapping tee in place; and
   a blade located outside of the main body, the cutting edge of the blade located radially outside the outer peripheral surface, the blade cutting off a thin layer of the outer surface of the plastic pipe or tapping tee as the main body is rotated relative to the plastic pipe or tapping.

13. The peeler device recited in claim 12, wherein the mandrel has a straight section and at least one tapered section, said at least one tapered section having helical threads.

14. The peeler device recited in claim 13, wherein the inner diameter of the plastic pipe or tapping tee is threaded onto the mandrel to prevent the mandrel from slipping inside the plastic pipe or tapping tee.

15. The peeler device recited in claim 13, wherein the mandrel can be easily removed from the peeler device.

16. The peeler device recited in claim 15, wherein the blade has two cutting positions.

17. The peeler device recited in claim 16, wherein the blade can be rotated into one of the two cutting positions, and each one of the two cutting positions has a respective cutting edge.

18. The peeler device recited in claim 12, wherein the mandrel has multiple positions relative to the main body.

19. The peeler device recited in claim 12, wherein the blade is a hardened tool steel cutting blade with two cutting edges.

20. The peeler device recited in claim 12, wherein the main body has an observation window and the plastic pipe or tapping tee can be viewed through the observation window to determine when the peel is complete.

* * * * *